United States Patent [19]

Suzuki

[11] 3,983,869

[45] Oct. 5, 1976

[54] HUMIDIFIER FOR AQUALUNG EQUIPMENT

[76] Inventor: Katumi Suzuki, 1-18 Kami Iida-dori, KIta, Nagoya, Japan

[22] Filed: Aug. 13, 1974

[21] Appl. No.: 496,965

[52] U.S. Cl. .......................... 128/142 R; 128/186; 128/203; 261/95; 184/55 A
[51] Int. Cl.² ...................................... A61M 16/00
[58] Field of Search ............. 128/142, 142.2, 142.3, 128/142.4, 145 R, 145.8, 186, 187, 188, 194, 199, 200, 201, 206, 207, 208, 209, 210; 261/95, 99; 184/55 A

[56] References Cited
UNITED STATES PATENTS

| | | | |
|---|---|---|---|
| 2,040,630 | 5/1936 | Silten | 128/193 |
| 2,075,193 | 3/1937 | Gerson | 261/95 |
| 2,507,705 | 5/1950 | Gaddini | 128/142.3 |
| 2,792,073 | 5/1957 | Boss | 184/55 A |
| 3,291,122 | 12/1966 | Engstrom et al. | 128/194 |
| 3,814,093 | 6/1974 | Gregory | 128/194 |

Primary Examiner—Robert W. Michell
Assistant Examiner—Henry J. Recla
Attorney, Agent, or Firm—Carroll F. Palmer

[57] ABSTRACT

A humidifer for aqualung equipment comprises a source vessel housing moistening water which is or is not contained in a fibrous material member, and a water applying passage disposed to communicate the source vessel with the gas supply passage of the respirator and normally shutting off such communication, whereby when pressure in the gas supply passage is temporarily lower than that in the source vessel upon respiration of the user, such pressure difference may cause the water in the source vessel to be applied in a sprayed form from the applying passage into the gas supply passage. A further humidifier includes a water containing fibrous material member disposed directly in the gas supply passage of the respirator and kept to be in a water containing condition by supplying water through the aforementioned water applying passage.

4 Claims, 4 Drawing Figures

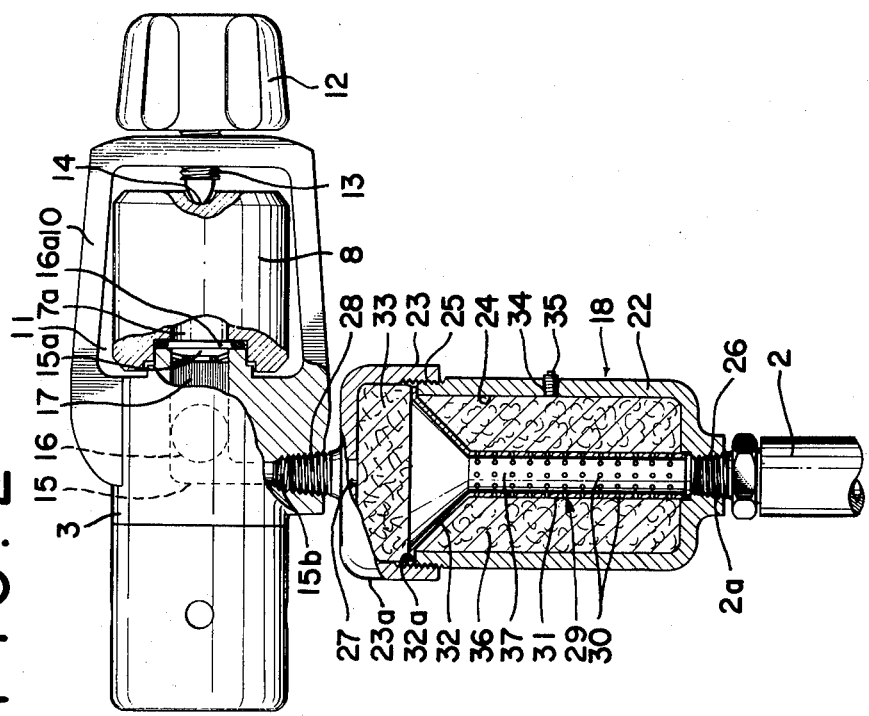
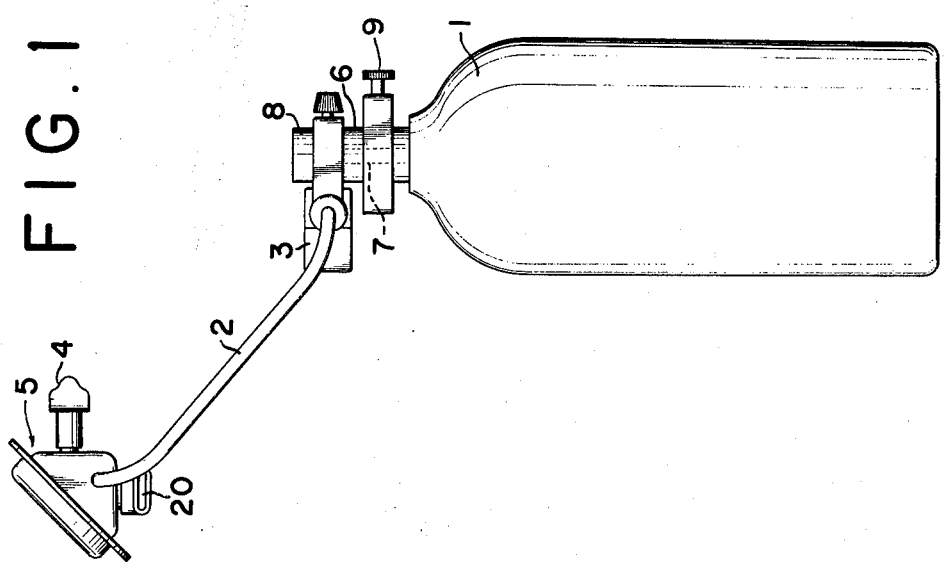

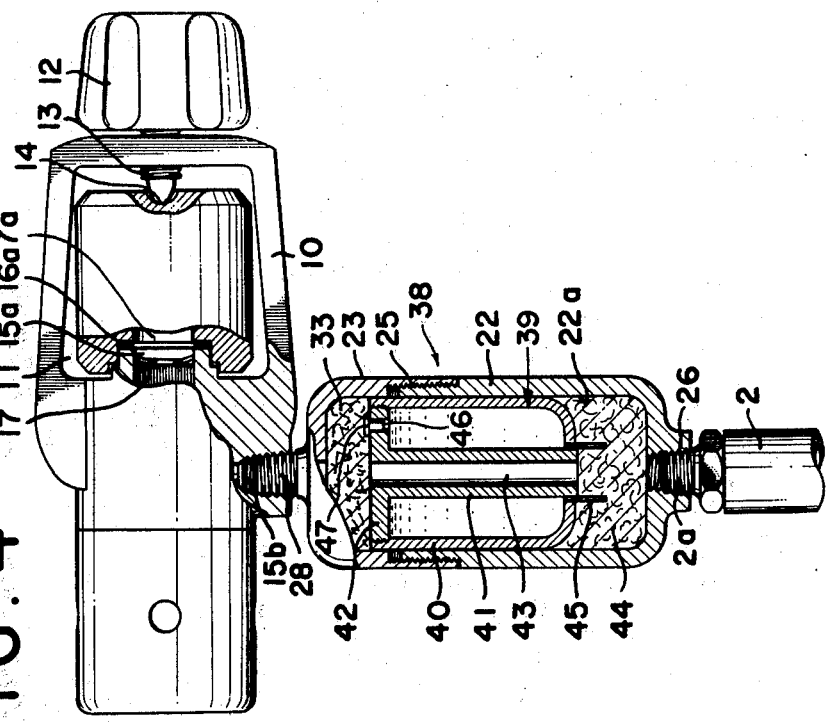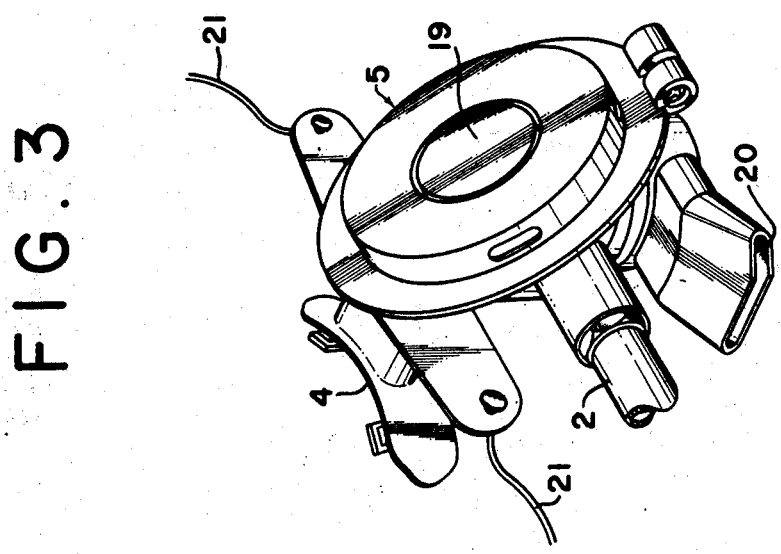

HUMIDIFIER FOR AQUALUNG EQUIPMENT

BACKGROUND OF THE INVENTION

This invention relates to a humidifier for aqualung equipment for applying moisture to be inhaled by a user.

It is well known that aqualung equipment generally comprises a highly pressurized gas cylinder adapted to be carried on the user's back, a gas supply passage communicating with the gas cylinder, a pressure reducing means for pressure-reducing and bleeding the gas from the gas cylinder into the supply passage, a mouthpiece adapted to be held in user's mouth and receiving pressure-reduced gas through the supply passage, and a respiration control unit operative to substantially enable respiration to be performed in the mouth-piece whereby the gas housed in the cylinder may successively be inhaled by the user while being pressure-reduced. Generally, an oxygen-containing gas is compressed under a pressure of approximately 150 atm within the gas cylinder in order to accommodate a sufficient quantity of gas for long time aquatic respiration. Such high pressure inherently refrains a large quantity of moisture from being contained in the gas trapped in the cylinder of the equipment. Moreover, since the gas when arriving at the mouth-piece has a pressure reduced substantially to 1 atm, i.e., the gas is then expanded approximately by 150 times of the gas trapped in the cylinder, the degree of moisture capable of being contained in the gas per unit of volume at the mouth-piece will be reduced by 1 over 150 times as compared to that in the trapped gas. Accordingly the gas in the mouth-piece may only have a much decreased quantity of moisture. Such dried gas causes the user to suffer an aching thirst. This implies that the user may not remain underwater for a long time or otherwise that such sufferings derived from the dried inhalant gas may be fatal to the user.

Further, such thirst caused by the dried inhalant gas will render it substantially difficult for the user to swallow saliva in order to arbitrarily remove tinnitus ascribed to the action of water pressure.

Accordingly, an object of this invention is to provide a humidifier capable of producing a moistening gas in the mouth-piece of the aqualung equipment.

SUMMARY OF THE INVENTION

Another object of this invention is to provide an aqualung equipment including a humidifier for applying moisture to a gas supplied into the mouth-piece whereby a gas having a suited relative moisture to inhalation by the user may be obtained so as to protect the user from suffering thirst and enable him to swallow saliva for arbitrary removal of tinnitus.

A humidifier of this invention may be mounted in the aqualung equipment of a well-known type and comprises a moistening water source, a moistening passage interposed in a serial communication with the gas supply passage of the aqualung equipment leading a gas from the gas cylinder to the mouth-piece of the equipment, and a valve means operative when a pressure in the supply passage is temporarily dropped by respiration or inhalation of the user thereby to bleed a water from the source into the supply passage in response to the pressure drop, whereby a required amount of water is applied to the inhalant gas only upon respiration or inhalation of the user thereby to prevent the applied water from remaining in a liquid phase in the gas supply passage and being inhaled into the lungs of the user to cause coughing of the user.

A further object of this invention is to provide a humidifier of the aqualung equipment including a water-containing member disposed in a gas supply passage of the aqualung equipment to directly contact a gas flowing therethrough thereby to efficiently apply moisture to the gas.

A still further object of this invention is to provide a simple structure of humidifier for an aqualung equipment as will be apparent from the below description.

BRIEF DESCRIPTION OF THE DRAWINGS

FIG. 1 shows a humidifier of this invention mounted on a conventional aqualung equipment including a gas cylinder;

FIG. 2 is an enlarged, partially sectional view of a humidifier of FIG. 1 connected to a gas outlet of a pressure reducing means disposed on the gas cylinder of the aqualung equipment;

FIG. 3 is a perspective view of a respiration control unit and a mouth-piece of the conventional aqualung equipment; and FIG. 4 is a partially sectional view of a modified humidifier of this invention.

DETAILED DESCRIPTION OF THE INVENTION

Aqualung equipment on which a humidifier embodying this invention is to be mounted is believed to have been so widely used and known that it does not need be detailed. Such aqualung equipment is, accordingly, described to such an extent as is required by the understanding of this invention. The conventional aqualung equipment as shown in FIG. 1 comprises a cylinder 1 trapping an oxygen gas or an oxygen containing air under pressure of 150 atm, a hose member 2, a respiration control unit 5 mounted at one end of the hose member 2, a pressure reducing means 3 disposed on the cylinder 1 to pressure-reduce the gas from the cylinder 1 approximately to 8 atm and bleeding thus pressure-reduced gas into the hose member 2, and a mouth-piece 4 carried on the respiration control unit 5 and adapted to be held in the user's mouth. The cylinder 1 has a cap 8 protruding from the upper end thereof and the cap 8 has a hollow cylindrical shape to form a gas bleeding passage 7 communicating with the interior of the cylinder 1. The gas bleeding passage 7 may be closed by a valve 9 disposed in an intermediate portion of the passage, when the cylinder 1 is not used. The pressure reducing means 3 as shown in FIG. 2 is provided with an outer support frame 10 encircling a space 11 in which the cap 8 is engaged so that the pressure reducing means 3 may be coupled to the cap 8 of the cylinder 1. The support frame has a setscrew 12 the tip 13 of which may come into an abutting contact with a recess 14 on a side surface of the cap 8 thereby to render rigid coupling between the cap and the pressure reducing means 3. The pressure reducing means 3 is provided with an internal gas passage 15 having a valve member 16 therein and a first filter 17 adjacent its inlet 15a. The inlet 15a of the gas passage 15 and an outlet 7a of the gas bleeding passage 7 of the cap 8 are abutted in alignment with each other in the coupling structure of the two components. An O-ring 16a is interposed between abutting surfaces circumferentially adjacent the inlet 15a and the outlet 7a. Upon inhalation of the user, gas may be led from the cylinder via gas bleeding passage 7, outlet 7a, inlet 15a of gas passage 15, gas passage 15, and valve member 16 so that the gas pressure reduced to approximately 8 atm may reach an outlet 15b of the gas passage of the pressure reducing means 3. The gas bled at the outlet 15b is received by a humidifier 18 of this invention and then directed to the mouth-piece 4 of the respiration control unit 5 through the hose member 2. The above-mentioned gas supply passage in which the moistening passage of the humidifier is disposed, is thus constituted by a passage formed to pass a gas from the valve member 16 of the pressure reducing means 3 through the hose member 2 to an inlet of the mouth-piece 4.

The respiration control unit 5 has the internal structure deleted from the illustration of the drawings but which substantially enables the aquatic respiration of the user with the mouth-piece held in the mouth. Specifically, it comprises a pressure reducing valve for pressure reducing the 8 atm pressure gas applied through the hose member to a suited pressure to the respiration and simultaneously applying thus further pressure reduced gas to the mouth-piece when the respiration or inhalation is performed by the user, a pressure regulator mechanism including a water pressure sensitive plate 19 to adjust the pressure of the gas applied to the mouth-piece to a desirable degree to the water depth of the user's location in response for action of the sensitive plate 19, and an exhaust opening 20 through which the user exhales gas into the surrounding water. The unit 5 may have a strap 21 to hold the unit in place on the user's body.

The humidifier 18 of this invention which is to be coupled with the above stated aqualung equipment will be described.

The humidifier includes a moistening water source vessel 24 consisting of a bottomed, cylindrical body casing 22 having an open upper end, and a closure casing 23 having a similar but shorter shape compared to that of the body casing 22. The body and the closure casings 22 and 23 are secured to each other by threaded portions 25 formed at the open ends, respectively. The body casing 22 has at the bottom a coupling bore 26 to which one end 2a of the hose member 2 is threadedly coupled. The closure casing 23 has an upper wall 23a on which a coupling protrusion 28 is disposed. The coupling protrusion 28 has a gas inlet passage 27 formed therein and extending through the upper wall 23a of the closure casing 23, and is threadedly coupled to the outlet 15b of the gas passage 15 of the pressure reducing means 3.

The humidifier further includes a moisture applying member 29 formed by a longitudinal, cylindrical wall 31 having a great number of perforations 30 therein and upper and lower end openings, and a substantially conical, non-perforated wall 32 so extending upward from the upper end opening of the cylindrical wall 31 as to form a trumpet shape gradually opening in the upward direction. Each perforation 30 of the cylindrical wall 31 should have a diameter and a spacing to the other which are so determined that the perforations may be kept to be substantially closed because of aqueous surface tension unless and until any pressure difference is present across the cylindrical wall 31. The desired diameter and spacing may be approximately 3 mm and 6 mm, respectively. The moistening member 29 thus constructed is housed in the water source vessel 24 so that the cylindrical wall lies in registry with the center line of the vessel 24, and fixedly secured to the vessel through the lower end opening of the cylindrical wall fitted in the coupling bore 26 and an uppermost annular edge 32a of the conical wall 32 abutted onto the upper opening edge of the body casing 22. In the interior of the closure casing 23 above the uppermost annular edge 32a of the conical wall 32 is disposed a second filter 33 made of a fibrous material. The moistening water source vessel 24 has a space defined by the inner surface of the body casing 22 and the outer surface of the moisture applying member 29 and in which a water-containing member made of a fibrous material is held. The body casing 22 has a water supply opening 34 formed in the lateral wall and a stopper 35 detachably secured to the opening 34. Thus, the cylindrical wall 31 will form a longitudinal inner passage designated by 37 constituting the aforementioned moistening passage interposed in a serial communication with the gas supply passage of the aqualung equipment.

In operation of the aqualung equipment having the above stated humidifier, when the user holding the mouth-piece in the mouth performs inhalation, the high pressure gas in the cylinder is bled at the outlet 15b while being pressure reduced by the means 3 and the gas bled flows into the hose member through the humidifier, say, via inlet passage 27, second filter 33, moistening passage 37 of moisture applying member 29 and coupling bore 26. Instantaneously upon inhalation of the user, the gas pressure is temporarily dropped in the gas supply passage of the equipment so that the pressure in the moistening passage 37 may be lower than that in the moistening water source vessel 24. Such pressure difference causes the water contained in the fibrous material member 36 to be bled in a sprayed form through the perforations into the moistening passage 37 whereby moisture may be applied to the gas to be inhaled by the user. This moistening action may be enhanced in the humidifier of this invention because flow of the gas is accelerated in the moistening passage by action of constriction caused by the conical wall 32 to the gas flowing thereinto under such pressure drop. When and so long as the user discontinues inhalation, the pressure in the moistening passage 37 is equal to that in the water source vessel 24 whereby the perforations may be filled with water of the fibrous material member 36 and thus kept to be closed because of surface tension of the water. Therefore, no water of the fibrous member may flow through the perforations into the moistening passage 37 and come to remain in the gas supply passage, which refrains such liquid phase water from being inhaled with the gas upon the next performance of inhalation thereby to prevent the user's coughing.

It is thus understood that the perforations may function as a valving means in which they may shut off the communication between the source vessel 24 and the moistening passage 37 when no pressure difference exists therebetween in discontinuance of the user's inhalation and may open to permit the water in the source vessel to be bled into the moistening passage in response to the pressure difference or drop in the moistening passage when caused by respiration of the user at the mouth-piece.

A modification of the humidifier is shown in FIG. 4 wherein similar elements to those of the embodiment of FIG. 2 are designated by the respective corresponding numerals. Any other arrangements than those specifically described below are identical to those in the embodiment of FIG. 2.

The modification designated by 38 has a modified moistening water source vessel 39 disposed in an upward region surrounded by the body and closure casings 22 and 23 so as to form a moistening passage 22a by a lower wall portion of the body casing 22. The source vessel 39 comprises a supplementary water source vessel 40 having an upper open end, a closure plate 42 threadedly disposed in the upper open end of the supplementary water source vessel 40, and a hollow cylindrical member 41 depending on the closure plate 42 to extend longitudinally in the supplementary vessel 40 so as to separate the vessel 40 into two halves. The cylindrical member 41 has the hollow interior 43 opening to the exterior of the source vessel 39 at the upper end through the closure plate 42 and at the lower end through the bottom of the supplementary vessel 40. The water-containing fibrous material member 44 is held in the moistening passage 22a positioned below the supplementary water source vessel 40 thereby to lie substantially in the gas supply passage of the aqualung equipment so that the member 44 is in contact with the gas passing through the passage. The moistening passage 22a has a plurality of nozzles 45 extending through the bottom of the supplementary water source vessel into the fibrous material member 44 to form a constricted passage which functions as an analogous valving means to the aforementioned perforations 30 in communication with the supplementary vessel and the moistening passage. The closure plate 42 may has a water supply bore 46 for supplying water into the supplementary source vessel 40, and a stopper 47 closing the bore 46.

In operation, the water in the supplementary source vessel may be supplied through the nozzles into the fibrous material member in the moistening passage 22a when a pressure in the body casing 22 may temporarily be lower than that in the supplementary source vessel upon the user's inhalation at the mouth-piece. The fibrous material member 44 may thus always be in a water-containing condition. The gas supplied from the cylinder of the aqualung equipment flows through the hollow interior 43 and when it passes through the fibrous material member in the moistening passage, moisture may be applied to the gas by contact with the water contained in the fibrous material member.

Because the fibrous member 44 may be always supplied with water by the supplementary source vessel and is placed in the gas supply passage of the aqualung equipment for a spraying action, the modification may enhance a humidifying efficiency compared to the first embodiment 18.

The valving perforations 30 or the nozzles 45 are not restricted to that operative due to water surface tension and may be substituted by any other means operable in response to pressure change occuring in the gas supply passage of the aqualung equipment, for instance a membraneous check valve or a pressure responsible throttle valve. Such a check or a throttle valves need not be modified in a known prior art structure thereof in order to be incorporated in the embodiments of this invention.

What is claimed is:

1. A combined aquatic respirator and humidifier for underwater diving use with a cylinder holding an oxygen-containing, highly pressurized gas carried on the back of a diver comprising a moistening water source vessel including a body casing and a closure casing removably attached to said body casing, said closure casing having a gas inlet passage formed therein for connection with the interior of said cylinder, said body casing having an outlet passage therein, a hose member having first and second ends, said outlet passage being connected to said first end of said hose member, a moisture applying cylindrical member disposed within said moistening water source vessel and communicating at one end thereof with said outlet passage and the other end thereof with said inlet passage and having means consisting of a plurality of apertures disposed in its peripheral wall for forming therein a water film produced by aqueous surface tension when no pressure difference exists across said peripheral wall, a water-containing hydrous member encased in a space defined between the outer peripheral wall of said moisture applying cylindrical member and the inner peripheral wall of said moistening water source vessel, and a mouth-piece communicating with the second end of said hose member and adapted to be held in the mouth of a diver for inhaling gas through said hose member.

2. The combined aquatic respirator and humidifier of claim 1 wherein there is a substantially conical, non-perforate wall extending from said other end of said cylindrical member forming therewith trumpet-shaped means that gradually opens in a direction towards said gas inlet passage.

3. The combined aquatic respirator and humidifier of claim 1 wherein the conical, non-perforate wall has extending across it a filter made of fibrous material.

4. A combined aquatic respirator and humidifier for underwater diving use with a cylinder holding an oxygen-containing, highly pressurized gas carried on the back of a diver comprising a moistening water source vessel including a body casing and a closure casing removably attached to said body casing, said closure casing having a gas inlet passage formed therein for connection with the interior of said cylinder, said body casing having an outlet passage therein, a hose member having first and second ends, said outlet passage being connected to said first end of said hose member, a supplementary water source vessel having an opened first end and a closed second end encased in said moistening water source vessel, a non-perforate, hollow cylindrical member having first and second ends extending in said supplementary water source vessel, said cylindrical member first end having a flange portion defining a closure plate sealingly closing said opened first end of said supplementary water source vessel, said closure plate being spaced from said gas inlet passage of said moistening water source vessel, said closed second end being spaced from said outlet passage of said moistening water source vessel, said cylindrical member second end extending and water-tightly fitted through said closed second end of said supplementary water source vessel, a water-containing hydrous member disposed in the space defined by the exterior surface of said second closed end of the supplementary water source vessel and the interior surface of the moistening water source vessel, thereby being in contact with gas passing through said hollow cylindrical member to said outlet passage, a plurality of capillary passages extending through said closed second end of said supplementary water source vessel having one end communicated with the interior of said supplementary water source vessel and the other end positioned in said water containing hydrous member, the inner diameter of said capillary passages being of a dimension capable of therein forming a water film by aqueous surface tension when no pressure difference exists across said supplementary water source vessel, water supply means constituted by a supply bore formed in said closure plate for supplying water into said supplementary water source vessel and by a stopper closing said supply bore, and a mouth-piece communicating with said second end of said hose member and adapted to be held in the mouth of a diver for inhaling gas through said hose member.

* * * * *